United States Patent [19]

Weissfloch et al.

[11] Patent Number: 4,781,787

[45] Date of Patent: Nov. 1, 1988

[54] WELDING EQUIPMENT

[75] Inventors: Reinhard Weissfloch, Stolberg; Christian Rech, Herzogenrath, both of Fed. Rep. of Germany

[73] Assignee: Wegener GmbH & Co. KG, Aachen, Fed. Rep. of Germany

[21] Appl. No.: 926,106

[22] Filed: Nov. 3, 1986

[30] Foreign Application Priority Data

Nov. 9, 1985 [DE] Fed. Rep. of Germany ... 8531749[U]

[51] Int. Cl.⁴ .................. B30B 15/04; B30B 15/34
[52] U.S. Cl. .................. 156/507; 156/304.6; 156/499; 156/580; 269/127
[58] Field of Search .......... 156/304.2, 304.6, 507, 156/499, 583.1, 583.8, 580, 157; 269/99, 100, 126, 127, 128, 129; 100/219, 242, 257

[56] References Cited

U.S. PATENT DOCUMENTS

| | | | |
|---|---|---|---|
| 2,516,602 | 7/1950 | Snyder | 156/507 |
| 2,698,273 | 4/1954 | Miner et al. | 156/502 |
| 3,586,584 | 5/1971 | Wilkins | 156/499 |
| 3,729,360 | 4/1973 | McElroy | 156/507 |
| 3,793,120 | 2/1974 | Spadano | 156/499 |
| 4,221,626 | 9/1980 | Clay | 156/366 |
| 4,239,574 | 12/1980 | Aust et al. | 156/507 |
| 4,445,677 | 5/1984 | Hansen et al. | 156/499 |
| 4,500,376 | 2/1985 | Deligt | 156/507 |

Primary Examiner—Michael Wityshyn
Attorney, Agent, or Firm—Shlesinger, Arkwright & Garvey

[57] ABSTRACT

Welding equipment for plastic plates and the like includes a support. First and second longitudinally extending spaced parallel clamping tables are movably mounted to the support so that the tables may be moved towards and away from each other. First and second clamping beams are provided. Each beam overlies one of the tables and is movable therewith and each beam has a first and portion pivotally associated with one of the tables. A lock system extends from each of the beams and cooperates with another lock system associated with the support. The lock systems permit the beams to be independently pivoted relative to the support. A heated blade is movably positionable between the tables.

16 Claims, 3 Drawing Sheets

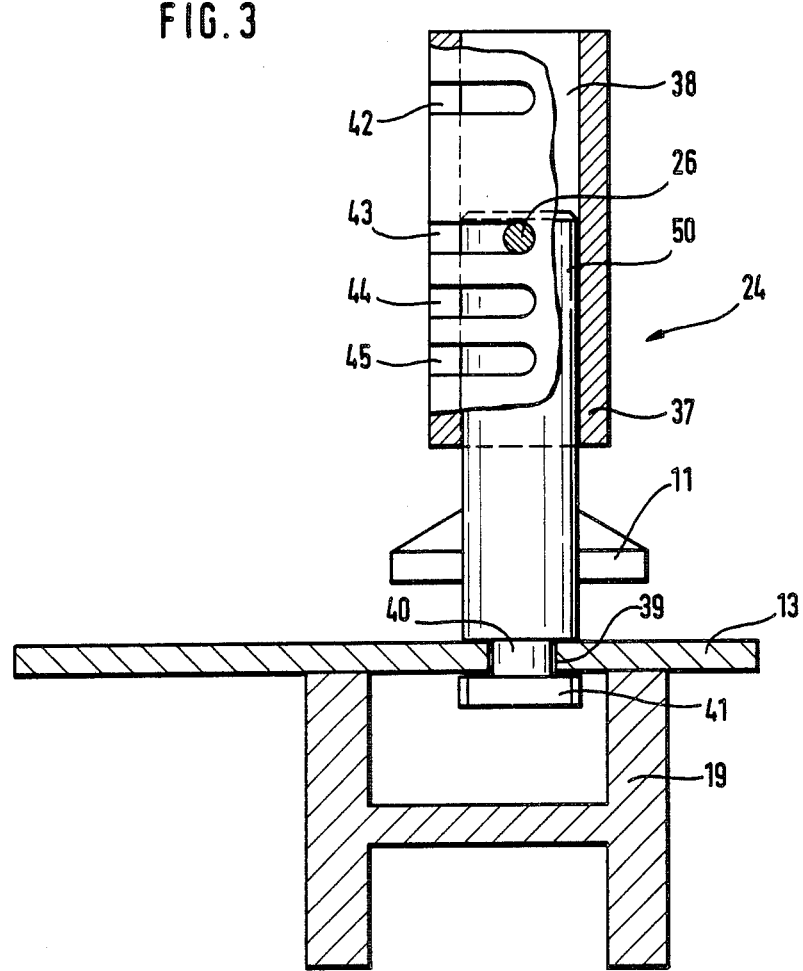

WELDING EQUIPMENT

The invention concerns equipment to weld together the edges of plastic parts, in particular plastic panels, with clamping systems to clamp the plastic parts, each clamping system consisting of a clamping table and a clamping beam with clamping elements mounted thereon, each clamping beam being linked at its ends by associated link members to the associated clamping table.

Such welding equipment comprises an elongated base frame to the top side of which are mounted two clamping systems, each exlending longitudinally parallel to the other. These clamping systems can be synchronously moved transversely relative to each other and essentially consist each of a clamping table stretching in the longitudinal direction and a clamping beam above also extending longitudinally, each clamping beam being provided with a plurality of clamping plates mounted next to one another in the longitudinal direction and lowered as needed onto the associated clamping table. A heating blade extends longitudinally to heat the edges of the plastic parts to be joined and is mounted between the two clamping systems. This heating blade can be moved out of the gap to allow the necessary lining up of the edges of the plastic parts prior to heating. A special stop beam is provided for the alignment, and can be vertically pivoted from a horizontal position to move into the center of the gap between the clamping systems.

Welding by means of such equipment is initiated by the clamping systems being moved against the stop beam, each system coming to rest by a widened segment, whereby they align the stop beam. Next the plastic parts are laid in place in the clamping systems in such a manner that they butt against the stop beam. After the plastic parts have been clamped by lowering the clamping plates against the particular clamping table, the clamping systems are so moved apart that the stop beam is pivoted out of the gap between the clamping systems and the heating blade is moved into this gap. Thereupon the clamping systems are moved toward each other again until the plastic parts touch the heating blade by their edges to be joined. The plastic parts then are heated at the heating blade and after this blade is removed they are subjected to a closing pressure by the clamping systems pressing them against each other. Once cold, the junction between the plastic parts has been established.

In the known welding equipment, the clamping beams are assembled to the particular clamping tables in permanent manner, or can be detached only with great difficulty. Such equipment therefore does not permit plastic parts to be welded into closed structures, for instance round or rectangular tubing, as these structures no longer could be removed from the equipment after welding. Accordingly the scope of application of such welding equipment is restricted.

It is therefore the object of the invention to so design welding equipment of the initially mentioned kind that it permits closed plastic objects to be made, in particular tubing.

This problem is solved by the invention in that the link members are provided at least on one side of the equipment, each with a separation system to loosen at least on one side the connection between the clamping beams and the clamping tables.

In the invention, a separation system connotes the design of the link members in such a way that the connection between the clamping beams and the clamping tables can be disengaged rapidly and simply, so that a plastic structure welded shut together in the peripheral direction can be removed at one side of the welding equipment after the connections there have been disassembled between the clamping beams and the clamping tables. In this manner, the known welding equipment can be used to manufacture tubing based on two plastic parts welded together and thereby the versatility of such equipment is much enhanced.

The separation systems can be designed in many ways. A simple way is to design them as positive-locking quick-disconnect devices. Such a quick-disconnect device illustratively comprises at one end a lock bar guided in the vertical direction in which it can lock in at least one position and at the other end a bolt that can enter an aperture in which it can be locked by rotating the lock bar. This type of quick-disconnect device is especially simple and reliable in operation.

In a further design, the lock bars can be locked in their guides at various heights. In this manner the distance between the clamping beam and the clamping table can be varied, and this is especially significant when the clamping beams also are height-variable relative to the clamping tables. Welding equipment so designed allows plastic parts to be welded together over a large range of thicknesses.

Appropriately, the lock bars each are provided with an outwardly projecting manual lever guided in slots of the guidances for the lock bars. Thereby it is an especially simple matter to carry out a quick-disconnect operation. Alternatively to the positive-locking quick-disconnect device, the separation systems also can be designed to be link means which in the connected state act as non-positive locking couplings between the clamping beams and the clamping tables. Illustratively this can be implemented using corresponding clamping members or also electromagnets.

The invention provides furthermore that the clamping beams are suspended at the ends opposite the separation systems by means of pivot links from the clamping tables. As a result, it is possible, when the separation systems are disengaged, to slightly pivot upward the clamping beams in order to facilitate in this manner the removal of the finished plastic object. It is especially advantageous to make the pivot links and the separation systems adjustable in height as, in this manner, it becomes possible to adjust the spacing between the clamping beams and the associated clamping table in relation to the thickness of the particular plastic parts to be welded, and to do so over a wide range, whereby welding equipment so designed allows plastic parts of the most diverse thicknesses to be processed. At least two pivot links, mounted at different heights should be provided for the clamping beams so that these clamping beams can be mounted at two different heights.

It is especially appropriate, when handling the separation systems and the clamping beams, to provide one rest system each in the vicinity of the pivot links to support the particular clamping beam when the separation system is disengaged. Using this rest system, the clamping beam then is kept suspended or even is slightly raised whereby the removal of the finished plastic object can be carried out in simple manner. The rest systems each should be provided with a spring rest to facilitate the disengagement or engagement of the separation system.

It is recommended, as regards the adjustability of the spacing between the clamping beams and the clamping tables, to make the rest systems adjustable in height to match their supporting effect to the particular spacing. Illustratively the rest systems each may be provided with a bolt rotatably resting in a clamping table and fitted with a thread on which is located a rest nut which is vertically displaceable, but irrotational and on which rests the clamping beam. Appropriately a cup-spring assembly is mounted in that case between the rest nut and the clamping beam.

The drawing shows the invention in further detail in relation to an illustrative embodiment.

Figure 1:
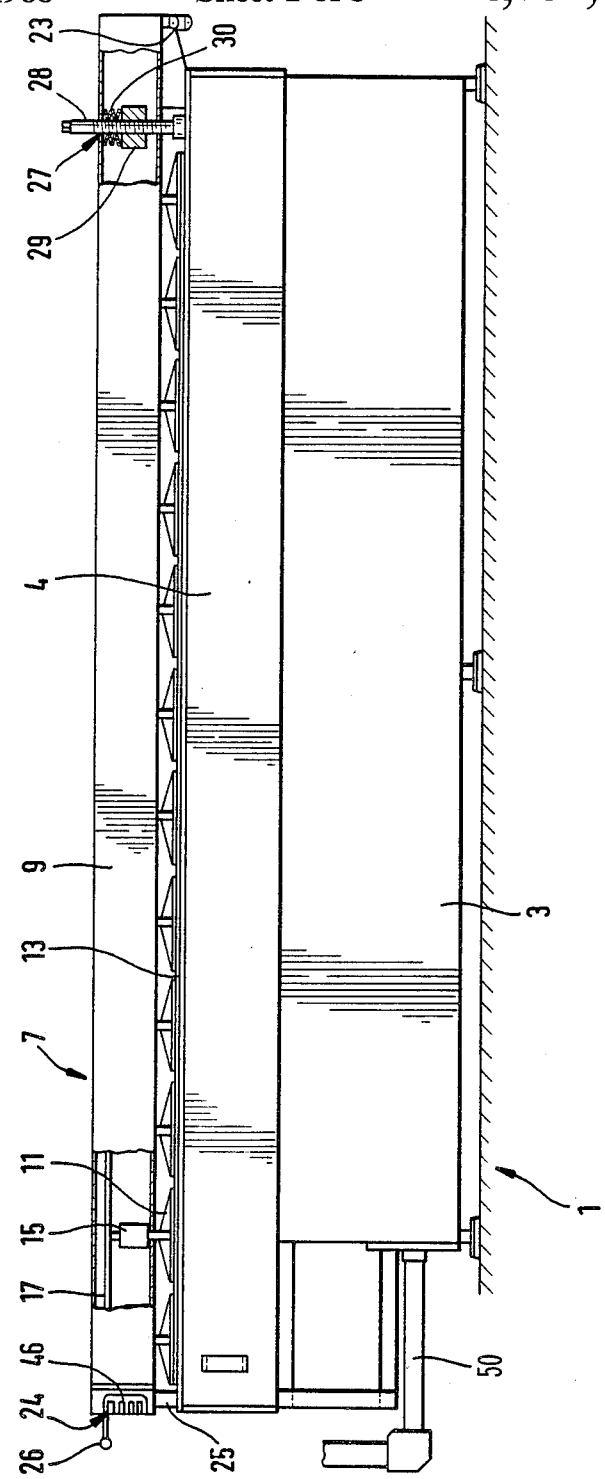
FIG. 1 is a side view of a welding equipment with separation systems.
Figure 2:
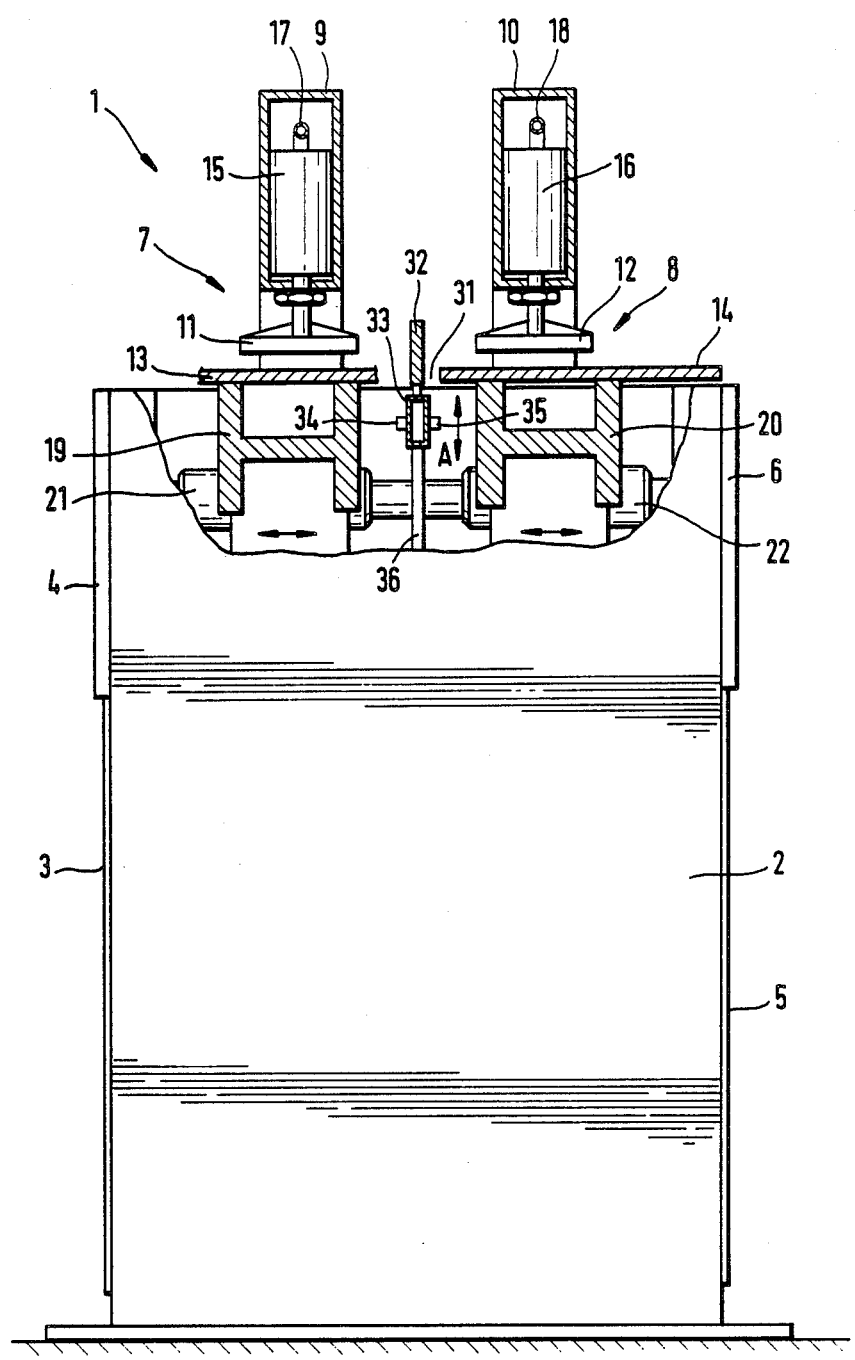
FIG. 2 is a cross-section of this welding equipment along a vertical plane.

FIG. 3 is an enlarged view of the separation system of FIG. 1. The welding equipment (1), as best shown in FIGS. 1 and 2, comprises an elongated base frame (2) enclosed on all sides by panels (3, 4, 5, 6). Furthermore, it includes two clamping systems (7, 8) extending longitudinally and consisting essentially each of a clamping beam (9, 10), with twelve clamping plates illustratively denoted by (11, 12) and with an associated clamping table (13, 14) below.

A pneumatic actuating cylinder (15, 16) is present for each clamping plate (11, 12) in the clamping beams (9, 10) and is fed from a compressed air source through hoses (17, 18) and can effect vertical displacement of the clamping plates (11, 12) by a corresponding pressure application. The two clamping tables (13, 14) are mounted below the clamping plates (11, 12), and of which the left clamping table (13) of FIG. 2 is shown only partly, each are solidly joined by cross-sectionally H-shaped table rests (19, 20) also extending longitudinally along the entire length of the welding equipment (1) and resting in longitudinally distributed manner at several sites so as to be transversely displaceable—that is, horizontally and transversely to the longitudinal direction of the welding equipment (1)—by means of linear guidances (21, 22). For reasons of simplicity, the drive for the transverse motion is not shown in further detail. The ends of the table rests (19, 20) are connected to the associated clamping beams (9, 10), namely at the right end of FIG. 1 by a link member (23) and at the left end of FIG. 1 by a locking system (24) forming a separation system. Each locking system (24) comprises a lock bar (25) guided in the particular clamping beam (9, 10) which, in the locked position, engages in positively-locking manner the particular clamping plate (11, 12). By rotating a manual lever (26), the locking bar (25) can be disengaged, whereby the particular clamping beam (9, 10) may be pivoted upward.

To prevent the clamping beams (9, 10) from falling on the clamping tables (13, 14) after the unlocking procedure, each clamping beam (9, 10) is provided with a rest device (27) in the vicinity of the link members (23). Each rest device (27) includes a threaded bolt (28) rotatably supported on the particular clamping table (13, 14) and passing through the particular clamping beam (9, 10) and provided within the particular clamping beam (9, 10) with a rest nut (29) that is connected by a thread to the threaded bolt (28). A cup-spring assembly (30) is located between the top side of the rest nut (29) and the inside of the clamping beam (9 or 10) and supports the particular clamping beam (9 or 10).

To adjust the supporting force, the threaded bolt (28) is rotated using a tool applied at the top. As a result, the height of the rest nut (29), which is supported in displaceable but irrotational manner within the particular clamping beam (9 or 10), can be adjusted. This adjustment may be such that the clamping beam (9 or 10), upon disengagement of the particular locking system (24), is kept suspended or even is slightly opened. As a result, a closed and welded-together workpiece can be extracted forward, that is to the left in FIG. 1.

The link members (23) are designed in such a manner that the clamping beams (9, 10) can be supported at at least two different heights to compensate for substantial differences in the thickness of the plastic parts to be welded together. The rest devices (27) and the locking systems (23) can be fitted correspondingly in the above sense.

As shown by FIG. 2, a heating blade (32) extends in the gap (31) between the two clamping sysbems (7, 8) along the length of the welding equipment (1) and has a rectangular cross-section, and is mounted on a stop beam (33). The stop beam (33) is located directly underneath the heating blade (32) and is in the form of a hollow channel. Stop strips (34, 35) are detachably fastened by screws to the longitudinal side surfaces of this blade 32. The length of the stop beam (33) and that of the stop strips (34, 35) corresponds to that of the heating blade (32). The stop beam (33) is seated on several vertical guide bars (36) which can be vertically moved by pneumatic cylinders. Therefore, by means of these cylinders, the heating blade (32) as well as the stop beams (33) can be displaced in the directions of the double arrows A.

A support (50) projecting from the end surface of the left side of the welding equipment (1) shown in FIG. 1 serves to hold an operating desk not shown herein in further detail. This support can be horizontally pivoted to the side.

The welding-together of two plastic panels is carried out as follows using the above described welding equipment (1):

First the clamping systems (7, 8) are moved apart so that the heating blade (32) and the stop beam (33) can be moved up into the gap (31) until the stop strips (34, 35) are at the same height as the clamping tables (13, 14). The clamping systems (7, 8) then are moved together until the free edges of the clamping tables (13, 14) come to rest against the stop strips (34, 35). Thereupon the closing pressure is applied and hence the stop beam (33) is lined up straight. Next one plastic panel each is laid from each side into each clamping system (7, 8), namely between the clamping plates (11, 12) and the clamping tables (13, 14). They are advanced until they come to rest against the stop beam (33) above the stop strips (34, 35). By this time the plastic panels project beyond the free edges of the clamping tables (13, 14) in relation to the thickness of the stop strips (34, 35). The pressure applied from the actuation cylinders (15, 16) lowers the clamping plates (11, 12) and thereby the plastic panels are clamped in this position so that they no longer can move relative to the particular clamping systems (7, 8).

After this alignment procedure, the clamping systems (7, 8) are moved apart. Simultaneously the heating blade (32) and the stop beam (33) are lowered into the position shown in FIG. 2, whereby the heating blade (32) moves into the position in the gap (31) between the clamping tables (13, 14). Then the clamping systems (7, 8) are again moved toward each other until the projecting edges of the plastic plates to be joined come to rest against the heating blade (32).

Then a fusing pressure is applied. The edges to be joined of the plastic plates are plasticized by the heating blade (32) by being raised to a corresponding temperature so as to make possible joining of these edges. Then the gap (31) is re-opened so that the heating blade (32) can be lowered below the plane of the clamping plates (11, 12). Thereupon the clamping systems (7, 8) are again moved toward each other until the plasticized edges of the plastic plates touch. Then a specific closing pressure is applied.

After the welding process is completed, and the actuation cylinders (15, 16) are de-pressurized, the clamping plates (11, 12) are lifted by means of springs and the gap (31) is opened. The presently welded-together plastic plate then can be removed sideways from the welding equipment (1). If, following welding, the plastic part is a closed shaped article, for instance a tube segment, then this plastic part, upon disengagement of the locking system (24), can be pulled out from the front end side of the welding equipment (1).

FIG. 3 more clearly shows the locking system (24), namely in a vertical cross-section of the welding equipment (1) looking on its front side, the left side of the welding equipment (1) being omitted. The H-shaped table rest (19) and the clamping table (13) mounted on it are shown.

A guidance (37) is present above the clamping table (13) and is connected to the clamping beam, which is omitted from this Figure. The guidance (37) includes a circular bore (38) guiding vertically the equally circular lock bar (25). This lock bar (25) projects by its lower end into an elongated slot (39) perpendicular to the plane of the drawing and in the clamping table (13). For that purpose the lock bolt is provided with an intermediate segment of circular cross-section of lesser diameter than the lock bolt (25), and comprises at its lower end an integral bolt (41) in the shape of the elongated slot (39) and, which in this Figure assumes the locked position by being rotated by 90° relative to the elongated slot (39). In this manner, the ends of the bolt (41) grip the underside of the clamping table (13).

The cross-sectionally shown manual lever (26) is mounted in the upper end of the lock bar (25). In the illustrated position, it is latched in one of a total of four horizontal slots (42, 43, 44, 45), namely in the second from the top, whereby the lock bar (25) cannot move vertically. The horizontal slots (42, 43, 44, 45) are connected to each other by a vertical slot (46), as best shown in FIG. 1.

When the manual lever (26) is rotated into the plane of the vertical slot (46), the lock bar (25) is pivoted in such a manner that its bolt (41) coincides with the elongated slot (39). Then the manual lever (26) and hence the lock bar (25), can be raised along the vertical slot (46) up to the highest horizontal slot (42), whereby the bolt (41) moves out of the clamping table (13). In the process, the clamping beam (9) is kept suspended by the rest device (27), see FIG. 1. By pivoting the manual lever (26) into the horizontal slot (42), the lock bar (25) can be locked in this position. As a result clear spacing is obtained which corresponds to that between the clamping plate (11) and the surface of the clamping table (13). Accordingly it is possible to pull out a welded plastic part, provided of course that the locking system omitted here between the clamping beam (10) and the clamping table (14) was correspondingly disengaged.

After the finished plastic part has been removed, the clamping beam (9) and the clamping table (13) can again be connected to each other, namely by lowering the lock bar (25) along the vertical slot (46) and then by rotating it by 90°, so that the manual lever (26) enters one of the horizontal slots (43 through 45). As several horizontal slots (43 through 45) are provided, it is possible to lock together the clamping beam (9) and the clamping table (13) even when the distances between them vary.

The lock bar (25) need not be moved upward after the manual lever (26) has been rotated into the vertical slot (46) if the cup-spring assembly (30) of FIG. 1 of the rest device (27) is prestressed enough so that the clamping beam (9) will be lifted following disengagement of the lock bar (25), whereby the space required to extract the finished plastic part between the lock bar (25) and the clamping plate (11) is generated by the upward pivoting motion of the clamping beam (9). To achieve the subsequent locking, the clamping beam (9) then must be forced down far enough until the lock bar (25) enters the elongated slot (39) by its bolt (41).

We claim:
1. Welding equipment, comprising:
  (a) support means;
  (b) first and second longitudinally extending spaced parallel clamping tables movably mounted to said support means, said tables adapted for being moved toward and away from each other;
  (c) first and second clamping beams, each of said beams overlying one of said tables and movable therewith, each beam has a first end portion pivotally associated with the associated table;
  (d) first lock means operably associated with said support means proximate an oposite second end portion of each beam;
  (e) second lock means operably associated with each of said beams and cooperating with said first lock means for permitting said beams to be independently pivoted into a selected position and to be secured therein;
  (f) welding means operably associated with said support means for heating adjacent edges of plastic members clamped between the beams and the associated tables; and
  (g) rest means operably associated with each of said beams for preventing each beam from engaging the associated table when said first and second lock means are not engaged.

2. Equipment as defined in claim 1, wherein:
  (a) said rest means being adjustable to independently maintain the beam spaced from the associated table; and,
  (b) said rest means being carried by the associated beams.

3. Equipment as defined in claim 2, wherein each rest means includes:
  (a) a threaded bolt extending through the associated beam and having a member engageable with the associated table;
  (b) a nut threadedly engaged with said bolt;
  (c) bias means extending from said nut and around the associated bolt and engaged with the beam for supporting the beam; and (d) said bolt is disposed proximate the associated beam first end portion.

4. Equipment as defined in claim 1, wherein:
(a) said first lock means includes an aperture in said support means proximate each of said beams;
(b) said second lock means includes a rotatable lock bar carried by each of said beams and having a head; and,
(c) each of said heads is positionable in the associated aperture so that rotation of the lock bar causes the head to engage said support means and thereby prevent the head from being removed therefrom.

5. Equipment as defined in claim 4, wherein:
(a) first and second sleeves are carried by said beams, each sleeve including a plurality of slots;
(b) each lock bar includes a lever for causing rotation thereof; and,
(c) each lever is positionable in the slots of the associated sleeve for thereby locking the associated beam relative to the associated table.

6. Equipment as defined in claim 5, wherein:
(a) each sleeve includes a first longitudinally extending slot and a plurality of spaced parallel slots extending generally transverse to and cooperating with said longitudinal slot.

7. Equipment as defined in claim 1, further comprising:
(a) alignment means operably associated with said support means; and,
(b) means operably associated with said alignment means for moving said alignment means from a first position spaced from said tables to a second position disposed therebetween.

8. Equipment as defined in claim 7, wherein:
(a) said alignment means includes a stop beam; and,
(b) first and second stop strips extend from said stop beam, said strips extending from opposite sides of said stop beam and being engageable with a side edge of the associated table.

9. Equipment as defined in claim 7, wherein:
(a) said tables are generally horizontally disposed; and,
(b) said welding means are movable from a first position above said tables to a second position disposed therebetween.

10. Plastic member welding equipment, comprising:
(a) a generally horizontal support;
(b) first and second horizontally disposed clamping tables movably mounted to said support for movement toward and away from each other;
(c) first and second clamping beams, each clamping beam overlying one of said tables and having a first end portion pivotally connected to the associated table and each beam movable with the associated table;
(d) first and second lock means associated with said support, each of said first and second lock means adjacent a second end portion of one of said beams;
(e) third and fourth lock means, each of said third and fourth lock means carried by one of said beams and cooperating with the associated one of said first and second lock means for positioning the associated beam at a selected angle to the associated table, each of said third and fourth lock means including adjustment means for regulating the angle between a beam and its associated table;
(f) said first, second, third and fourth lock means serving to position said clamping beams relative to said tables;
(g) clamping means being associated with said clamping beams and movable relative to said clamping beams; and
(h) means for welding together adjacent edges of first and second plastic members, each of the members being clamped between a beam and its associated table.

11. Equipment as defined in claim 10, wherein:
(a) said first and second lock means each include an aperture in said support adjacent the associated beam; and,
(b) said third and fourth lock means each include means positionable in the associated apertures and engageable with said support for preventing removal therefrom.

12. Equipment as defined in claim 11, wherein said third and fourth lock means include:
(a) a sleeve carried by each of said beams at an end thereof;
(b) each sleeve having a longitudinally extending slot and a plurality of spaced parallel slots extending generally transversely therefrom; and,
(c) a bolt rotatably positioned in each sleeve and having a head positionable in the associated aperture and a lever extending from said bolt and movable within said longitudinal slot so as to be positionable in one of said parallel slots.

13. Equipment as defined in claim 10, further comprising:
(a) first and second rest means, each of said rest means carried by one of said beams and disposed proximate the first end portion thereof for preventing the associated beam from engaging the associated table.

14. Equipment as defined in clainm 13, wherein each rest means includes:
(a) a threaded bolt extending through the associated beam and having a head engageable with the associated table;
(b) a nut positioned within and secured to the asociated beam and operably connected to said bolt so that rotation of said bolt causes said nut and thereby the associated beam to be vertically displaced relative to the associated table; and,
(c) bias means disposed about said threaded bolt and extendiing from said nut for supporting the associated beam.

15. Equipment as defined in claim 13, further comprising:
(a) alignment means; and,
(b) means operably associated with said alignment means for displacing said alignment means between a first position disposed below said tables to a second position disposed therebetween.

16. Equipment as defined in claim 10, wherein:
(a) said clamping means includes a plurality of clamping plates carried by each beam and disposed proximate the associated table; and,
(b) means positioned within each clamping beam and engaged with said plates for moving said plates toward the associated table.

* * * * *